(12) United States Patent
Gaudio

(10) Patent No.: US 6,182,584 B1
(45) Date of Patent: Feb. 6, 2001

(54) INTEGRATED CONTROL AND DESTRUCTIVE DISTILLATION OF CARBONACEOUS WASTE

(75) Inventor: Craig T. Gaudio, Idaho Falls, ID (US)

(73) Assignee: Environmental Solutions & Technology, Inc., Idaho Falls, ID (US)

(*) Notice: Under 35 U.S.C. 154(b), the term of this patent shall be extended for 0 days.

(21) Appl. No.: 09/448,022

(22) Filed: Nov. 23, 1999

(51) Int. Cl.$^7$ ............................... F23G 5/12; C10B 51/00
(52) U.S. Cl. .................... 110/229; 110/185; 110/219; 110/224; 110/342; 110/101 C; 201/13; 201/25; 202/122
(58) Field of Search .................... 110/185, 189, 110/190, 218, 219, 220, 222, 224, 228, 229, 341, 342, 101 C; 34/179, 181, 182, 183; 201/13, 14, 15, 25; 202/111, 122, 123

(56) References Cited

U.S. PATENT DOCUMENTS

| | | | | |
|---|---|---|---|---|
| 1,669,023 | * | 5/1928 | Runge | 201/13 |
| 3,112,255 | * | 11/1963 | Campion | 208/11 |
| 4,176,010 | * | 11/1979 | Dudek | 201/27 |
| 4,247,367 | * | 1/1981 | Reilly | 202/105 |
| 4,358,344 | * | 11/1982 | Sass et al. | 201/4 |
| 4,421,524 | * | 12/1983 | Chittick | 48/209 |
| 4,437,419 | * | 3/1984 | Hertel | 110/259 |
| 4,665,841 | * | 5/1987 | Kish | 110/234 |
| 4,977,840 | * | 12/1990 | Summers | 110/346 |
| 5,497,712 | * | 3/1996 | May et al. | 110/342 |
| 5,666,890 | * | 9/1997 | Craig | 110/229 |
| 5,846,385 | * | 12/1998 | Chien | 196/98 |

* cited by examiner

Primary Examiner—Denise L. Ferensic
Assistant Examiner—Ken B. Rinehart
(74) Attorney, Agent, or Firm—Malin, Haley & DiMaagio, P.A.

(57) ABSTRACT

A system and process to provide integrated control for the pyrolytic composition of organic (biomass) waste products especially for municipal solid waste systems. The system includes integrated control that monitors biomass waste stream throughout the entire system and the products produced therefrom and includes presorting, controlling the amount of material processed in a continuous manner, shredding, removing moisture in a continuous process that is controlled and providing the waste stream to the distillation unit for pyrolytic action where it is converted into gaseous fuel and a char residue. The gaseous fuel is scrubbed clean and monitored and stored and reused to provide heat to the system. The entire system may be self-sustaining and continuous with very little or no human intervention. An integrated real time computer control system includes sensors and measuring devices with all the major components to ensure integrated efficiency.

6 Claims, 6 Drawing Sheets

Dust and odor controls

Material preparation controls

Pyrolitic gas generation #1 controls

Pyrolitic gas generation #2 controls

FIG. 4

CHAR CONDITIONER CONTROLS

GAS CONDITIONING CONTROLS

WATER TREATMENT CONTROLS

GAS COMPRESSION AND STORAGE CONTROLS

GENERATOR CONTROLS

*FIG. 5*

INTEGRATED CONTROL AND DESTRUCTIVE DISTILLATION OF CARBONACEOUS WASTE

BACKGROUND OF THE INVENTION

1. Field of the Invention

The present invention relates generally to a self-sustaining, continuously controlled, pyrolytic process and apparatus for the conversion of organic, non-metallic waste materials into higher quality and quantity of combustible gases, as useful energy sources. The invention includes an integrated control process and system that ensures continuous automated processes that ensure consistent energy recovery with little intervention.

2. Description of Related Art

The rapid rate of depletion of fossil fuels has made the search for new energy sources increasingly important. One of the more promising sources of new energy is green energy, e.g. biomass and other waste products which are presently being destroyed or discarded. Available space for landfills, conventionally used for disposal of these wastes, is diminishing. In addition, landfills have other shortcomings, e.g. leaching of pollutants into the ground and water tables, odors, extended time needed for refuse decomposition, and settling of the landfill site.

Incineration has been widely used as an alternative to landfill waste disposal. This is generally carried out in a combustion chamber to which air is added to accomplish combustion. Because solid waste materials vary widely in composition and moisture content, the combustion reaction is difficult to control and maintain. Incomplete combustion of the waste is common with the associated discharge of large quantities of smoke and pollution into the atmosphere. Though open air or forced air incineration of solid waste reduces waste volume, the inherent air pollution resulting is environmentally unacceptable. Incineration, even if not polluting, generates large amounts of $CO_2$ which is undesirable.

As an environmental improvement over incineration, the pyrolytic process employs high temperatures in an atmosphere substantially free of oxygen (such as a practical vacuum) to convert organic waste to other states of matter such as a gas or vapor with an ash like residue.

Numerous pyrolysis and waste gasification systems have been proposed, however, a practical efficient system has not achieved significant commercial use. Pyrolysis has been affected in part by heat transfer problems attendant to the large variance in composition and moisture content of the waste. As to these variances in content of urban waste, statistical samples have been analyzed from diverse geographical areas beginning in the 1980's in an effort to determine its chemical and generic composition. The analysis disclosed in the table below is still considered to be valid today and generally comprises the following:

| Analysis Chemical-Physical Analysis/Values in Percentages, except as indicated | North-west | North-east | Central | South | Islands | Italy |
|---|---|---|---|---|---|---|
| Water | 40% | 41 | 43 | 49 | 50 | 44 |
| Combustible Materials | 36 | 35 | 33 | 29 | 30 | 33 |
| Non-Combustible Materials | 24 | 24 | 24 | 22 | 20 | 23 |
| Calorific Power, Kcal/kg | 1510 | 1410 | 1330 | 1020 | 1128 | 1300 |
| Analysis/Percentages | | | | | | |
| Sub-Filter or Cup/Drum Screen | 18 | 16 | 18 | 21 | 13 | 18 |
| Cellulosic Matter | 25 | 23 | 23 | 16 | 20 | 22 |
| Plastic Matter | 9 | 7 | 6 | 7 | 8 | 7 |
| Metals | 3 | 3 | 3 | 2 | 2 | 3 |
| Inert Materials | 8 | 9 | 9 | 5 | 8 | 7 |
| Organic Matter; Various | 37 | 42 | 41 | 49 | 49 | 46 |

Because municipal waste contains significant amounts of plastic that melt before burning, such waste tends to quench the combustion and can eventually stop the pyrolytic gasification process entirely. Large amounts of smoke and other pollutants generated by this inability to adequately control the combustion of waste material which are emitted into the atmosphere have compromised the commercial utility of the gasification process.

Incomplete or marginal pyrolysis is unreliable in continuous operation. Even employing complicated and expensive procedures for capturing the smoke and other pollutants, inadvertent emissions of large amounts of these pollutants remain common.

For example, to achieve relatively steady state operation when gasifying common municipal waste, temperatures for pyrolysis must be used which approach the temperature at which slagging of inorganic material occurs within the pyrolysis chamber. The temperature in the pyrolysis chamber often rises above the slagging temperature due to the difficulty in maintaining the temperature within the pyrolysis chamber. The inorganic components of the waste melt form a tenaciously adhering slag coating on all surfaces exposed to the waste. Variances in content and moisture of municipal waste make controlling the pyrolysis temperature below the slagging point extremely difficult.

Prior devices and processes have not adequately addressed these problems which must be dealt with on a continuously changing basis. Accordingly, it would be a significant advancement in the art to provide a method and apparatus which is self-sustaining, and simultaneously controls sorting, drying, distillation, cracking, purification, and pollution while significantly reducing waste and recovering substantial amounts of energy from the waste. Such process and apparatus for the conversion of waste materials are disclosed herein.

BRIEF SUMMARY OF THE INVENTION

A system and method providing a self sustaining continuously, automatically controlled pyrolytic process for the conversion of organic, non-metallic waste materials into energy providing combustible gases used to sustain the pyrolytic process in order to reduce municipal waste and increase the efficiency of municipal waste elimination.

The heart of the system is a destructive distillation unit which subjects pre-sorted organic waste to pyrolytic action in a substantial oxygen free chamber in which temperatures generate above 1,000° Fahrenheit. The purpose of this chamber is to convert organic waste materials into gaseous reusable fuel and a fine char residue. Waste material to be processed is continuously fed into the unit and is controlled by a master control unit which provides for complete control of the entire system, keeping the system self-sustaining and automated. Prior to the waste materials being entered into the destructive distillation unit, the materials are subjected to a dryer to remove 90% of the moisture, resulting in waste material that has less than 10% moisture. This is to insure a complete and thorough pyrolytic conversion within the destructive distillation unit to prevent variations and fluctuations in the gasification process itself.

In order to properly provide the most efficient organic waste materials to the dryer and to the pyrolytic chamber, it is very important to provide an automated feed system that separates out metallic objects which are not suitable with this process, and plastic products which are also not particularly suitable, which is done upstream of the dryer. It is also desirable to provide a shredder for the organic waste material prior to its entry into the dryer to get a more thorough drying. As the waste material exits the shredder, the shredded waste is deposited on a weight belt conveyor that is part of the automated process and moved to a belt elevator that transfers the shredded waste material into the dryer in a continuous process.

Gas (a fuel source) is generated in the destructive distillation unit or pyrolytic chamber from the biomass waste and is removed from the chamber, recovered, filtered, scrubbed and used as fuel to generate heat to self-sustain the action in the destructive distillation unit. The gas fuel may be transferred and stored in a main gas storage tank. It can also be used to generate steam for a turbine generator for electricity as a by-product of excessive energy.

Of extreme importance in the overall system, is that there is a main integrated processor and a series of sensors and control systems that control the rate and flow of the waste material feed at different points, the temperatures within the dryer and the destructive distillation unit, the quality of the gases being generated based on the material fed into the unit and in essence a complete control of the process at the important components to ensure efficient, self-sustaining activity to optimize the pyrolytic waste reducing and energy generations.

In the destructive distillation unit, there is a continuous waste feed that can be done by a sealable rotating screw that transfers the waste into a sealed chamber which is maintained at a practical vacuum (without oxygen) so that temperatures in the chamber can be adjusted between 1000° and 1400° Fahrenheit to insure complete gasification of the organic waste with a small residue of char. The speed of the waste feed screw is controlled and monitored.

By analytically controlling each important system component with sensors and control circuits, each and every vital component of the system and step in the process can be integrally maximized for efficiency to ensure a sustained automated system.

The integrated process control includes, at the system level, controls for dust and odor from the system output, control for mercurial preparation so that the organic waste material is integrally controlled, a pyrolytic gas distillation unit or chamber that is controlled, a char conditioner control, gas conditioning controls, water treatment, gas compression storage (fuel gas) and turbine generator controls. By controlling all of these steps and components in an integrated fashion together, not only is optimum efficiency achieved, but the operation is continuous and self-sustaining with very little intervention.

The dust and odor is controlled by an integrated draft transmitter, integrated odor sensor, dust collector differential transmitter and integrated temperature and flow transmitters, all of which cooperate together to control dust and odor that leaves the system.

With respect to preparing the waste material, the material is dumped onto a feed belt with the tipping area that controls and operates a conveyor, an air dam, a sump pump and safety systems. There is also integrated, automated sorting of ferrous and non-ferrous glass materials on a continuous basis. The constant feed shredder has material size, controlled by a grate opening. Since that shredder controls operate the material shredder and safety systems.

The pyrolytic gas generator which is the distillation unit, also includes an integrated weigh feeder adjusting the feed rate of material to the dryer, an integrated dryer outlet temperature transmitter to control the dryness of materials that are to be delivered to the distillation unit, with the outlet temperature automatically controlling the dryer speed, and an integrated gas chromatograph and temperature transmitter that allows the distillation controls to maintain the speed and temperature of the distillation unit while it is producing pyrolytic gas.

The system also has residue such as char. The char removal has a temperature transmitter for controlling and reducing the temperature of the char that is removed for storage.

It is important to control the fuel gas that is created in the distillation unit and as such the system includes an integrated gas temperature, particulate and opacity transmitter to remove particulates from the pyrolytic gas and an integrated sulphur transmitter to remove sulphur compounds from pyrolytic gas.

The system also has a water treatment control to operate equipment to treat water waste.

The resultant fuel gas has gas compression storage that controls the unit with the integrated pressure transmitter to operate a low pressure compressor to boost the clean pyrolytic gas pressure to be stored in the storage tanks. There is also an integrator pressure transmitter for high pressure controls to operate a compressor to deliver pyrolytic gas to the gas turbine.

The electrical generator includes an integrated synchronized transmitter to control the throttle of the turbine and the turbine auxiliary equipment when necessary.

By having a single integrated control system that is controlled by a real time application computer processor program and monitoring the essential, vital components and process steps ensures the optimum continuous generation of exhaust gas in a safe manner and ensures the efficient, self-sustaining operation of the system.

It is an object of this invention to provide a self-sustaining, integrated, real time control process and apparatus in which organic waste materials are efficiently and inexpensively pre-treated prior to pyrolization so as to continuously and precisely control the moisture content of the waste feed stream and subsequent by-products. The invention becomes self-sustaining by utilizing the surplus heat of combustion of the waste products material to accomplish the pre-drying of the waste feed while the arrangement of the apparatus prevents contamination from the pyrolysis unit itself. In addition, the pre-treatment chamber and the pyrolysis chamber are provided with fixed waste inlet and outlet passageways which cooperate to prevent heat loss and atmospheric contamination so as to insure complete and efficient pyrolysis.

Another object of this invention is the pre-treatment, e.g. sorting and pre-drying, of incoming waste feed stock so as to generate a higher quality and quantity of gaseous fuel. Sorting and significantly pre-drying the waste prior to introduction into the pyrolysis distillation unit results in enhanced yield quantities and quality of by-product gases which can be used not only to sustain the operation, but also provides excess fuel to operate ancillary devices. Pre-drying also enhances recovery of useful by-products such as char.

Another object of this invention is the integration of process inputs, real time control, and process monitoring within a single control device. This integration of the apparatus into a real time control environment optimizes entire output.

Yet another object of this invention is the processing of municipal solid waste into usable energy sources having value by means of a single point control of recycling, drying, pyrolysis, cracking gas treatment, heating and electrical generation which achieves the following:

Reduction of the volume of landfill waste;

Conversion of waste to energy;

Reduction of atmospheric pollutants.

In accordance with these and other objects, which will now become apparent hereinafter, the instant invention will now be described with particular reference to the accompanying drawings.

PREFERRED EMBODIMENT OF THE INVENTION

Figure 1A:
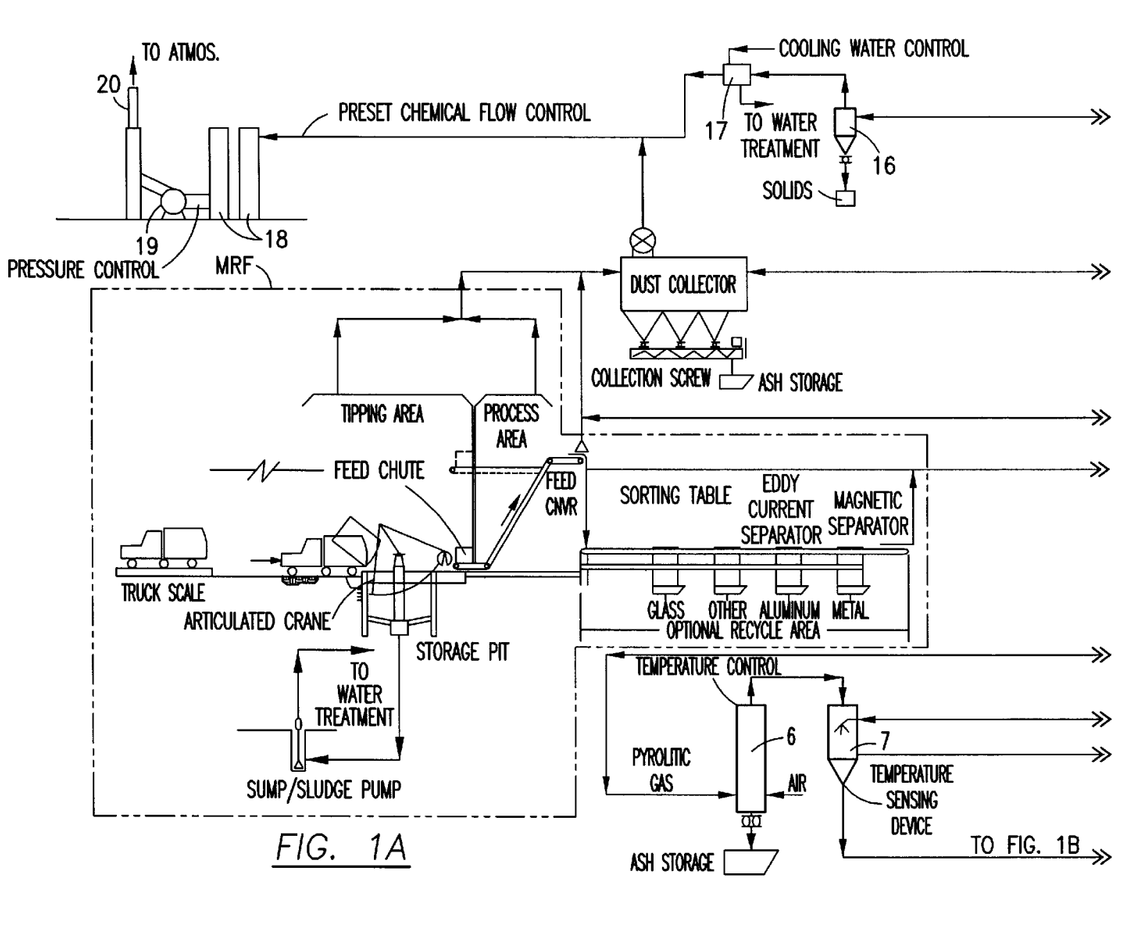
FIGS. 1A and 1B when considered together provide a schematic illustration and process flow diagram of the preferred embodiment of the present invention.
Figure 1B:
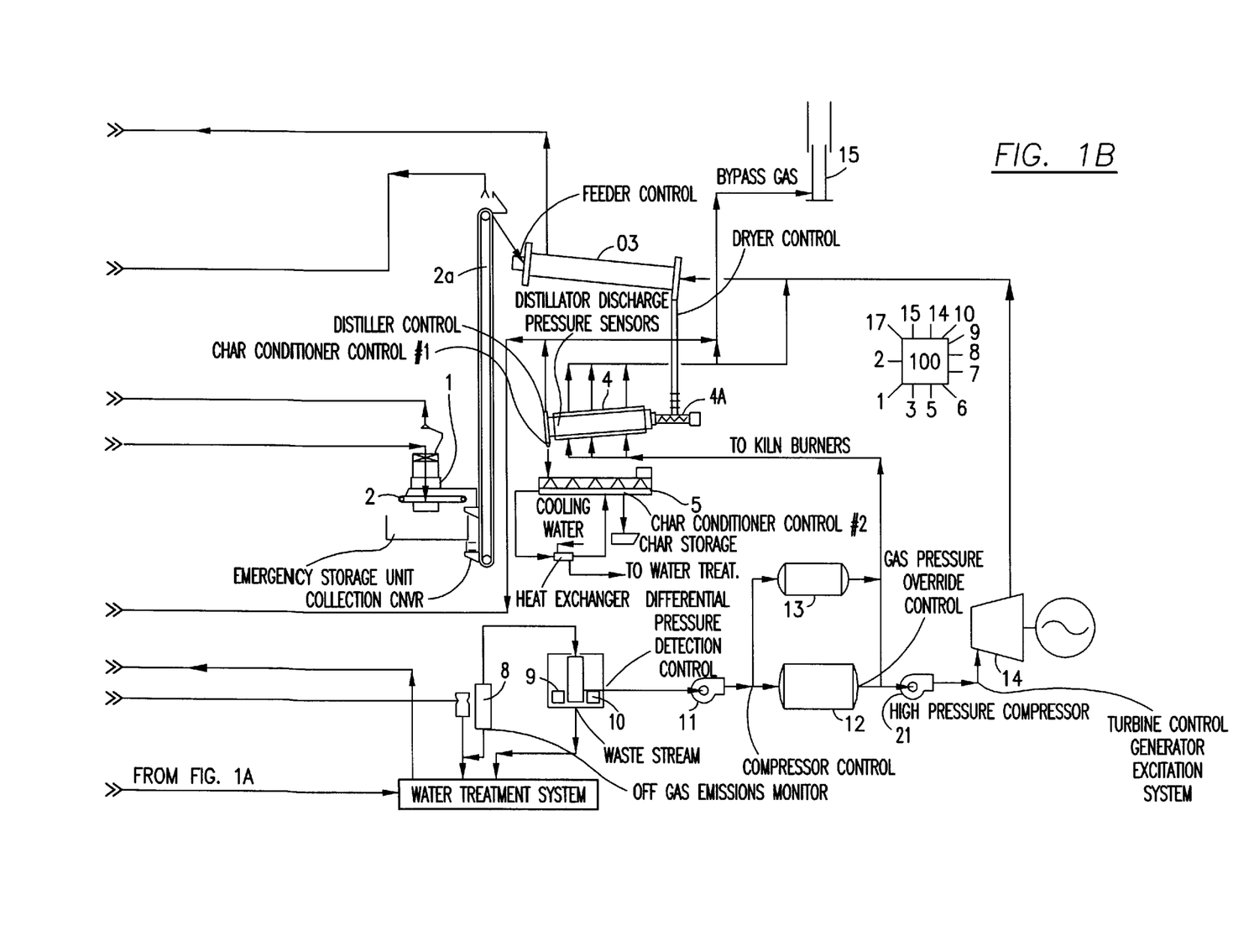

Referring now to the drawings and, in particular, FIGS. 1A and 1B, the system and process are described.

The process being controlled is a continuous self-sustaining municipal waste pyrolysis process utilizing a "real time" integrated control system to enhance and improve the energy conversion of waste to energy. The process and system are shown in FIGS. 1A and 1B. The system is based on the principle of simultaneously controlling the sorting, distillation, cracking, gas purification, and pollution control of the organic waste to energy process. The process described herein reduces the waste volume by 90% and recovers up to 95% of the available energy in the waste.

Shredded organic waste is fed into a rotary drying kiln, which utilizes waste heat from the pyrolysis unit 04 and combustion turbine 14 to dry the material to less than ten percent moisture content. Once dried, the waste is transferred to the destructive distillatory (pyrolysis) unit 04 using a rotary screw feed system 4a that will transfer the waste into the sealed unit. The distillatory (pyrolyzer 04) is an oxygen free environment device operating at temperatures above 1000–1200° F. wherein the conversion of organic materials to gaseous products takes place. This gaseous (fuel) is then refined to improve the available energy content and remove the pollutants, then transferred to storage 12 or 13 for use as energy in the system.

The key to this process is the integration of the multiple processes into a single point "real time" control and data acquisition system 100, described below.

Although a Municipal Recycling Facility (MRF) shown in FIG. 1A is shown dotted as optional, the MRF is important in the control scheme.

The MRF: Solid waste will be introduced from solid waste trucks into a storage pit. From the pit the waste will flow onto a slow moving belt, where glass, plastic, aluminum, metal, and other non-organic material will be removed. The MRF is shown in FIG. 1A in the optional block inside the phantom lines.

Shredder: The organic waste material is shredded in a typical organic shredding device 1 which is controlled using the "real time" process controller 100 to control the on/off and grate position for the size and quality of the shred. The shredder control logic allows the shredder to be started, once the downstream weigh belt conveyor 2 feeder is running. The shredder is located over the weigh belt conveyor 2 and an emergency bypass system, which operates only if there is plugging (stoppage) in the downstream systems.

Feed System: The feed system is comprised of a weigh belt conveyor 2 feeder that will feed the shredded material onto a bucket or press belt elevator conveyor 2a, which then feeds the dryer 03. The feed rate will be varied based on the differential pressure of the dryer, which provides the control signal to vary the belt speed. The feed rate quantity will range from 30 lbs./min. to 140 lbs./min.

Dryer: The drying unit 03 will heat the organic waste from ambient up to 350° F. to remove up to 99% of the moisture contained in the waste. Heat for the dryer will be generated in two separate sources. The first source will be the waste heat from the outer shell of the pyrolysis (distillatory) unit 04 and the second source will be from the exhaust (waste heat) of the combustion turbine unit 14. The dryer 03 will be controlled by the dryer outlet temperature and the quality of gas from the distillatory, i.e., gas chromatography and master controller 100. When the dryer 03 reaches 350° F., the dryer will require less waste. A backup fuel source for the dryer for startup purposes will be a propane tank (not shown) or natural gas.

Distillator: The distillator or pyrolyzer 04 is the major component of the process. Control of the distillatory and ancillary equipment will be based on several process controls. The control is based on quality and quantity of gas discharging from the distillator 04 and the exhaust gas temperature of the distillator 04. The main control will be from a gas chromatograph, located at the discharge of the distillator which will send a signal to the weigh belt feeder 2 to speed up or slow down. The gas quantity will be a first stage trim control, which is based on a signal from the flow element in gas discharge. A second trim will be the exhaust temperature which senses the outlet temperature and controls the distillator burner control.

Char Conditioner: The char conditioner 5 is no more than a removal and cooling device, controlled by the outlet temperature of the char. The incoming char and ash constituents at a temperature above 1200° F. is cooled in a rotary screw conveyor that is linked to the distillator 04 and is therefore sealed from the atmosphere. Since very little is left as char and ash, it would not be economically feasible to attempt reuse of this material. However, nearby industrial plants may be able to utilize the char as a supplemental fuel. The sterilized char can be easily disposed, with no fear of pollutants into the environment. Control of this device 5 is via temperature sensing units at the discharge of the distillatory 04 and the discharge of the cooler 5 (both solid end and water end). The inlet temperature of the cooler 5 presets the incoming water and the final char temperature acts as a trim to the water control.

Gas Cracker: The product gas produced in the distillator 04 will flow into a gas cracking unit 6 which will be heated up to 1200° C., where the organic constituents of the carbonized gas are cracked into short chain components. In addition to the thermal destruction of organic pollutants, the gas converter performs the removal of any heavy oils and tars remaining in the gas. The heavy liquids and tars removed can either be added to the char for fuel or disposed of in a lined pond. As a result, a homogenization of the gas leaves the cracker 6 to be cooled. Most of the control of this unit is determined by temperature and the amount of heavies leaving the chamber. A constant temperature control is maintained with the trim via the amount of heavy constituents being discharged.

Gas Cooler: The cracked gas is quenched in a counter flow quench (cooling chamber) 7 which cools the gas from its elevated 1000° C. temperature, leaving the cracking unit to a manageable 150° C. The device is controlled via a temperature sensing device at the discharge of the system. As the discharge gas temperature increases or decreases, so does the position of the cooling water valves.

Scrubber: The hydrosonic gas scrubber 8 removes all of the remaining organic (if any), inorganic, particulate, and acidic pollutants, such as $SO_2$. The scrubbing water is neutralized with sodium hydroxide, lime, limestone, or calcium hydroxide. Control of the scrubber is by means of an off gas emissions monitor to detect particulate and gaseous emissions. The set point for the controller will be a given point according to the area environmental regulations. Increases in particulate or gaseous emissions will be automatically controlled by increasing the solutions of neutralizers and water.

Gas Filters: After the wet scrubbing, the gases will pass through a series of gas filtration devices 9 and 10 which will remove any organic and inorganic compounds as well as mercury vapors and hydrogen sulfide. Control of these devices will be by means of differential pressure detection to indicate the need for cleaning or regeneration of the filters.

Compressor System: The clean gas will be drawn into the suction of a gas compressor 11 which will elevate the gas pressure up to a level required by the burners on the distillator unit 04. The compressor system is capable of handling the full load flow from the distillator and increase the gas pressure up to 30 psig. Control of the compressor will be pressure inside the main and distillator storage tanks 12 and 13 and the inlet pressure of the compressor itself. The purpose of the compressor is to maintain 30 psig of pressure in the two gas fuel storage tanks and a slight positive pressure at the discharge of the distillator 04.

Combustion Turbine: One of the major users of gas produced is a combustion turbine unit 14, which utilizes the distilled gas to generate electricity and waste heat in the distillator 04. A high pressure (250 psig) compressor will compress the gas from the main storage tank 12 and feed the inlet of the combustion turbine. The exhaust gas of the turbine will be used to further dry incoming waste. The electricity will be used internally in the process, with excess being sold to a utility or nearby user. Control of the combustion turbine 14 will be electrical demand on the generator excitation system, with an override on gas pressure inside the main gas storage tank.

Flare Stack: A flare stack 15 is inherent to this type of process in order to prevent over pressurization of the system and to protect personnel and equipment. The flare stack will operate via pressure sensors in the distillator 04 discharge line and the pressure in the two storage tanks. If any of the three show increases in pressure beyond a predetermined set point, the flare will automatically be activated. The flare stack will shut down upon the return of the lower pressure in the three systems.

Cyclone Separator: Once the hot gases leave the combustion turbine and flow through the dryer, a cyclone separator 16 is used to remove any solid particles from the dryer off gas and solid particles collected from the tipping area. Since cyclone separators are based on velocity, control will be by design rather than any actual control device.

Condenser: One of the final stage devices in the system will be a condenser 17, FIG. 1A), which will sub-cool the gases to a level that is acceptable for atmospheric discharge and a temperature acceptable for the final odor control device. Control of the condenser 17 will be by means of controlling the cooling water inlet that will then control the off gas temperature.

Odor Control: Odor is a complex mixture of organic gases and are removed via an odor control unit 18 in a counter-current packed tower that utilizes sodium hypochlorite and hydrogen peroxide in the two-stage removal of any final odors generated from the process. Since there is no detection device for odor, control will be by means of presetting the chemical flow into the unit and adjusting by smell.

Gas Discharge: The gas discharge system comprises the Induced Draft (ID) fan 19 and Stack 20. The ID fan takes suction on the entire process, from the combustion turbine exhaust up through the odor control unit. The central point of control for the ID fan will be the outlet of the dryer. A set point pressure WC will be used to control the damper positioner of the ID fan. Any pressure increases or decreases will determine the opening position of the ID fan damper.

Control Integration: The controls described above are integrated into a "real time" processing unit 100 that regulates and control off gas flow, retort temperature, retort gas quality, product gas flow and pressure, gas cracking and char production, environmental emissions, and finally electrical generation. The various devices described will be integrated into the "real time" control scheme using the following devices:

Shredder 1—Amperage, weigh belt chute feed differential pressure

Weigh Belt 2—Dryer differential pressure, trim with retort off gas flow

Dryer—Retort off gas Chromatography, retort differential pressure

Retort—Off gas Chromatography, gas storage tank pressure

Char Conditioner—Outlet char temperature

Cracking Unit—Cracking unit temperature, heavies discharge and exit gas flow

Gas Cooler—Gas discharge temperature, trim with gas flow and cooling water temperature Gas Scrubber—Off gas emissions monitor (CEMS)

Gas Filter—Differential pressure and timed regeneration

Composer—Tank pressures and retort discharge pressure

Combustion Turbine—Electrical load demand and gas storage tank pressure

Flare Stack—Retort discharge pressure and pressure in storage tanks

Condenser—Off gas discharge temperature

Figure 2:
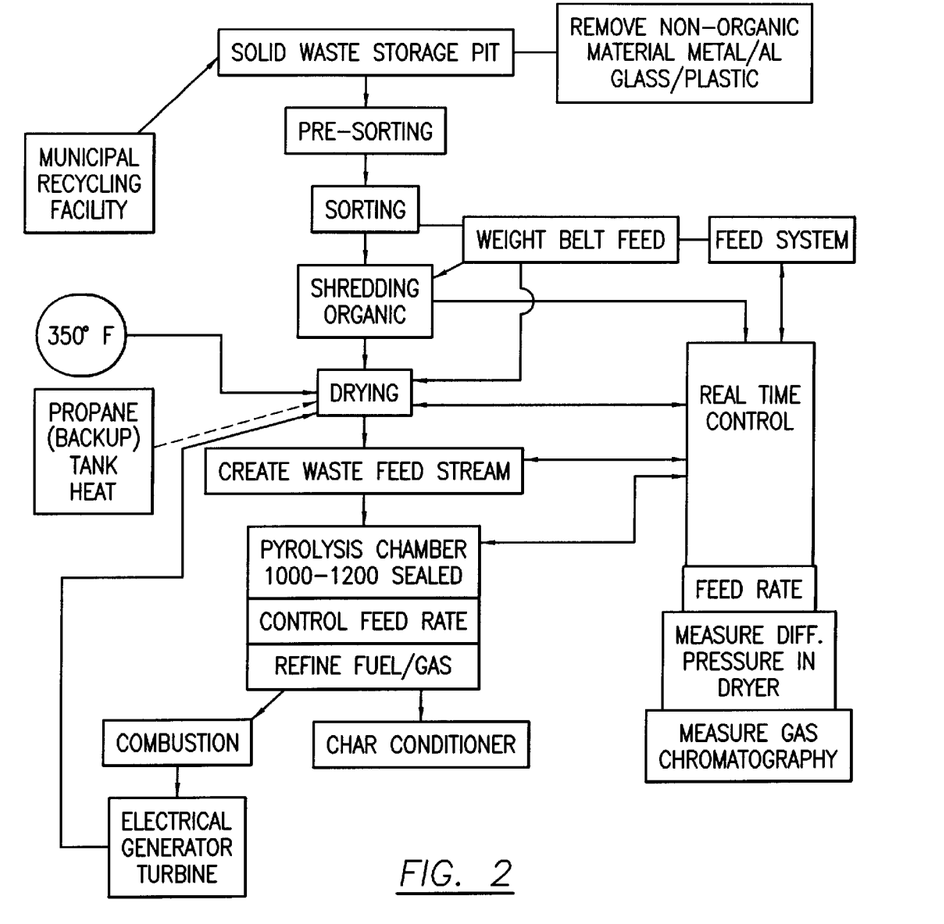
FIG. 2 is a flow chart showing portions of the process in accordance with the present invention.

Referring now to FIG. 2, the overall flow chart for the system shows a municipal recycling facility that includes a solid waste storage pit, at which point all non-organic material such as metals, aluminum, glass and plastic are removed during the presorting process. This continues on into the sorting where material is shredded and includes a weight belt feed system that is connected to the shredder and also to the real time control that controls the feed system. The amount of organic material that is shredded is fed to a drying unit to remove up to ninety percent of its moisture, which is also controlled by the dryer. Again the real time control is connected into the dryer that also allows for insuring that the waste feed stream that is created from the dryer travels to the pyrolysis chamber at the proper rate. The pyrolysis chamber is connected to the real time control which controls the feed rate and the refined fuel gas. The gaseous output from the pyrolysis chamber generates fuel gas for combustion for the electrical turbine generator and also back to the dryer. Also, the output of residue goes to the char conditioner when the char is cooled and captured.

The real time controller 100 also adjusts feed rate, measures differential pressures in the dryer and measures gas chromatography for controlling the overall system. The drying unit is kept at 350° Fahrenheit or any other desirable temperature to achieve removal of water. The backup propane tank could be used for the dryer under certain conditions.

Figure 3:
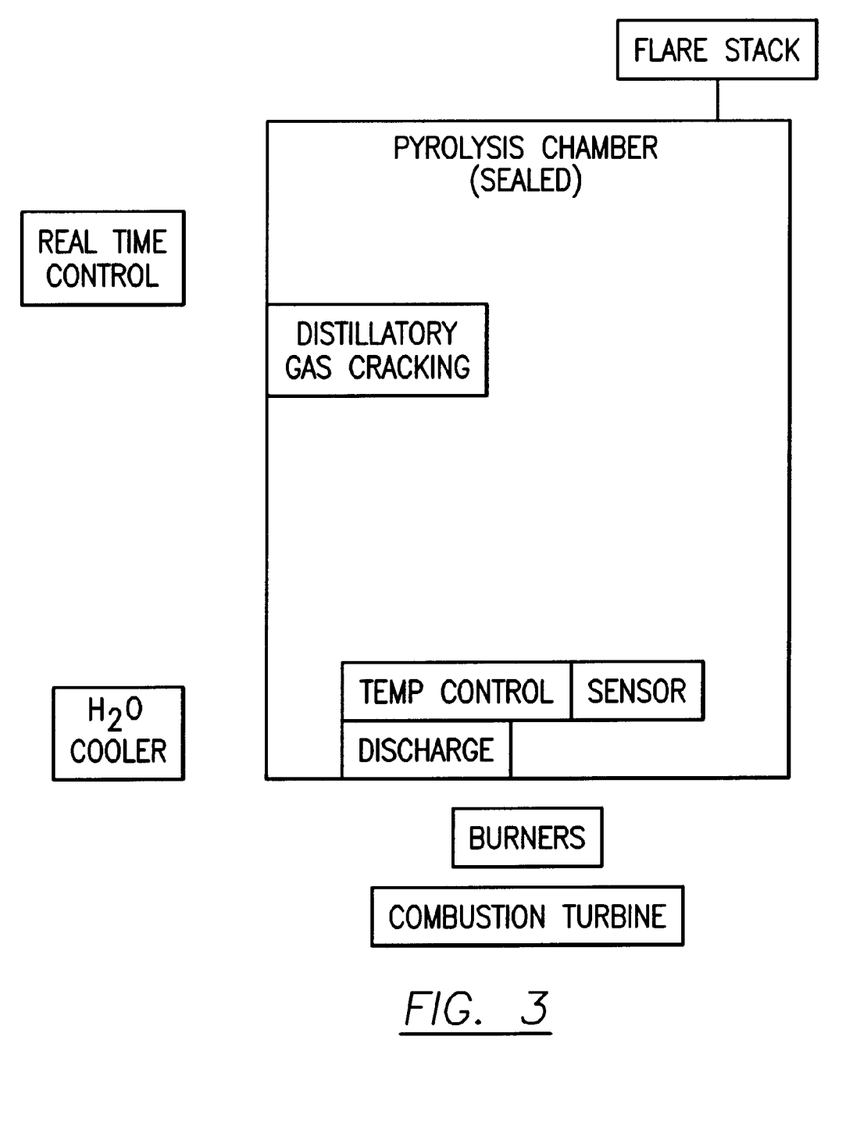
FIG. 3 shows a schematic diagram of the operation of the pyrolysis chamber and its associated equipment.

Referring now to FIG. 3, control of the pyrolysis chamber which is sealed is shown. Within the pyrolysis chamber a distillery operation is taking place where the gas is processed in a cracking operation to obtain the maximum desirable gases that are used for energy. The chamber also has a sensor for preventing over pressurization. The chamber includes a temperature control and sensors and discharge to monitor the condition of the gases that can be discharged to the burners and combustion turbine. The water cooler is used for the char to bring down the temperature of the char.

The system with the real time controller 100 is capable of simultaneously controlling sorting distillation, cracking, gas purification and pollution control, all of which is integrated to reduce the volume of waste by ninety percent and recover ninety-five percent of the gases for use as energy in a self-sustaining system.

Figure 4:
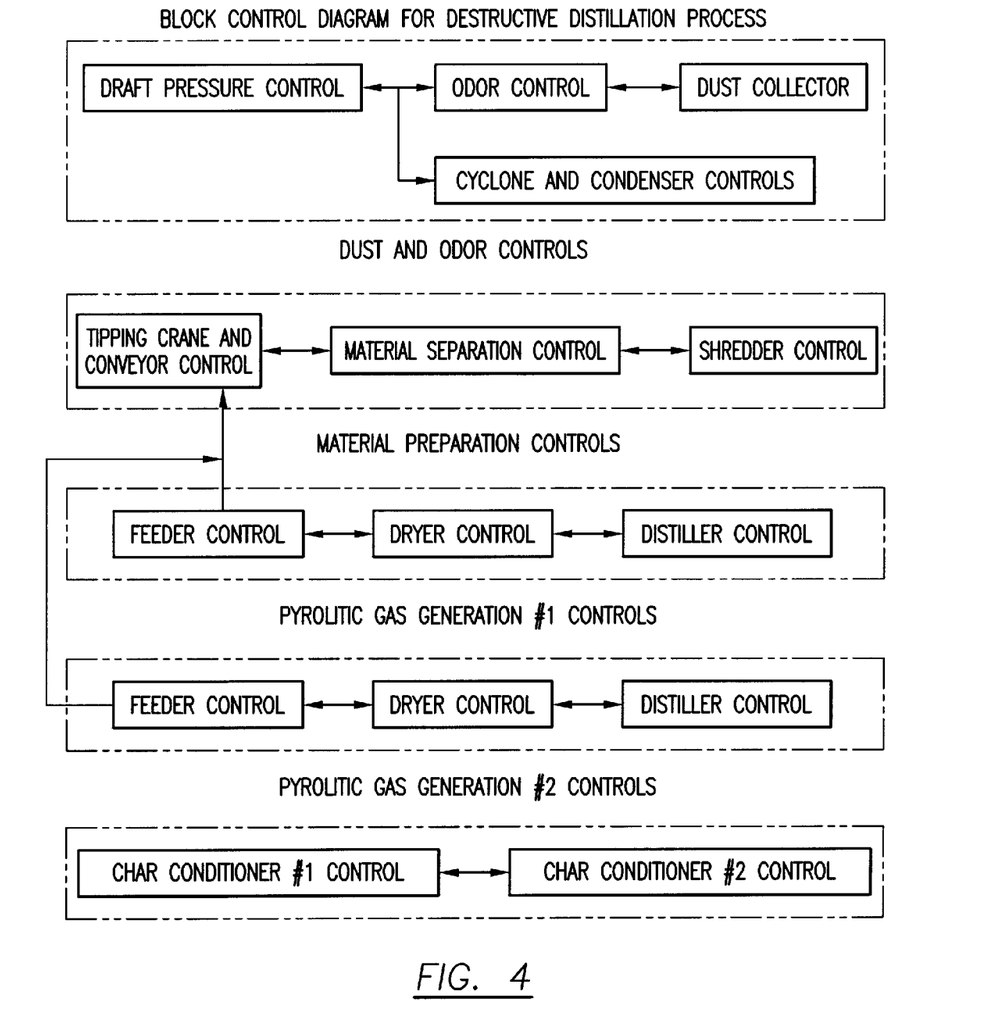
FIG. 4 shows a block control diagram for the destructive distillation process.

Referring now to FIG. 4, the system includes a dust and odor control, material preparations control, pyrolytic gas generation controls 1 and 2. Also shown at the bottom of FIG. 4 are char conditioner controls number 1 and 2.

Figure 5:
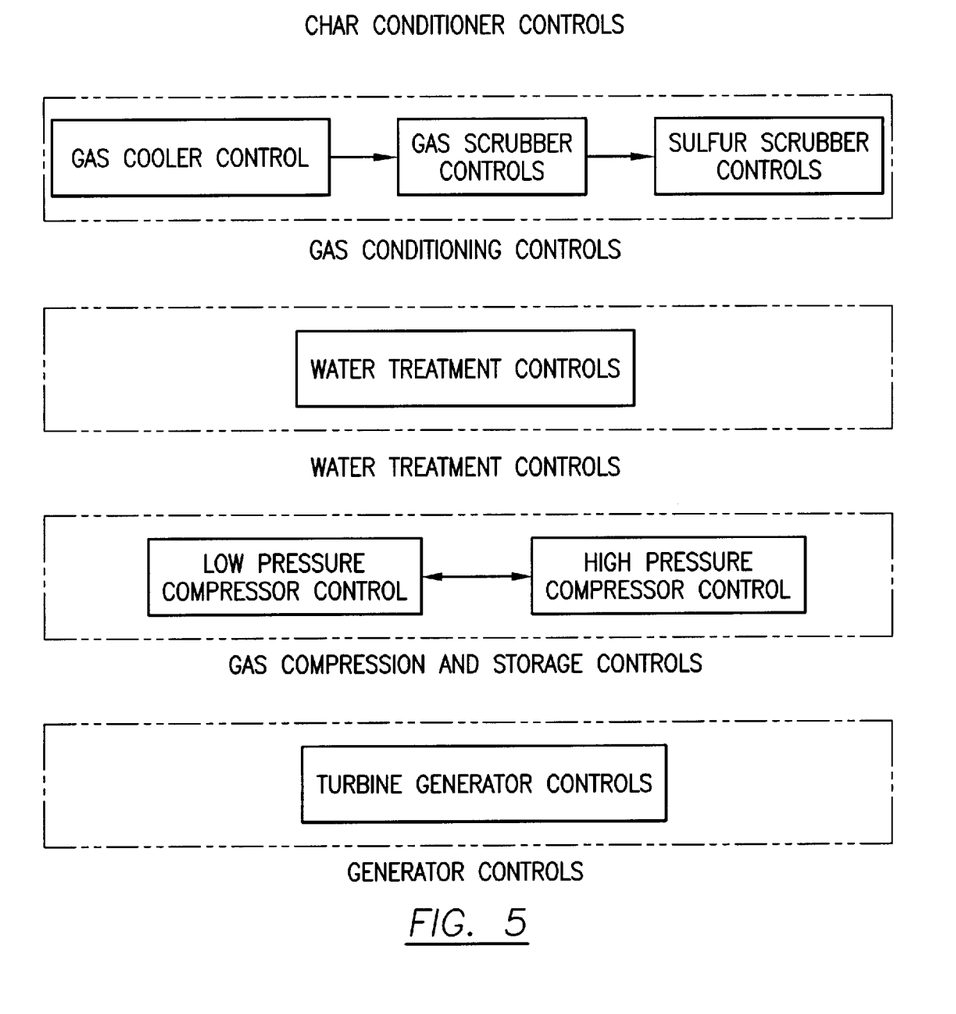
FIG. 5 shows additional controls and a block control diagram for the destructive distillation process.

FIG. 5 continues from FIG. 4 with the heading char conditioner controls which refer back to FIG. 4, gas conditioning controls, water treatment controls and gas compression and storage controls. Finally, FIG. 5 shows a generator control.

When viewing FIGS. 4 and 5, the overall block control diagram for the destructive distillation process is shown.

The dust and odor controls include draft pressure control, odor control, a dust collector and cyclone and condenser controls shown at element 16 on FIG. 1A. This is all controlled by signals from the real time central control processor described above.

The material or waste material preparation controls include a tipping crane and a conveyor control, material separation control and a shredder control. Again, all of which is controlled by a real time processing unit that integrates and controls these various actions pursuant to the destructive distillation chamber.

The destructive distillation unit includes pyrolytic gas generation controls which could be one or more systems that have the gas generators. Material is controlled and fed into the rotary screw 4a shown in FIG. 1B into the unit itself 04 where the waste material is processed. But the controls include controlling the dryer output and input, the feeder control from the waste unit material and controlling the speed and activity within the destructive distillation unit 4.

At the bottom of FIG. 4 shows char conditioner control number 1 which would relate to the pyrolytic gas chamber number 1 control and char conditioner number 2 control which relates to the pyrolytic gas generation number 2 control. Thus, the waste or char removed from the destructive distillation unit goes to a cooling water through a rotary screw into a char conditioner and char storage and is controlled by the char conditioners.

FIG. 5 shows gas conditioning controls that control gases that are distilled in the destructive distillation unit and how they are controlled and processed after they leave the distillation unit, which is 04 in FIG. 1A. The gas cooler control is connected to a gas scrubber control and also a sulphur scrubber control for removal.

The water treatment controls deal with cooling water that is used to treat the exhaust gases in the condenser 17 in FIG. 1A.

In order to store the recovered gas from the destructive distillation unit 04, a low pressure compressor controller is used which feeds the recovered fuel gas into a main gas storage area and into a kiln heat gas storage area, which is 13 in FIG. 1B. The low pressure compressor allows for building up pressure and forcing the extra gas into the storage tanks. A high pressure compressor control is used to feed gas into a turbine generator where it is combusted from generating electricity.

Finally, the system includes the turbine generator control itself which provides for electricity based on the output of a turbine generator. Steam from the turbine generator is also provided to the dryer for heating purposes.

When viewing the various controls provided for in FIGS. 4 and 5, it becomes apparent that the entire system for efficiently treating organic waste material, is all coordinated by a myriad of control sensors and elements that work simultaneously and together to produce the most efficient result.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system for the controlled pre-treating, pyrolyzing, collection and cleanup of waste materials and recovery of the useful energy, comprising:
   (a) a Municipal Recycling Facility to separate organic material (biomass) and to remove all non-biomass materials and store such biomass materials;
   (b) a biomass waste stream supplied from said store of biomass material;
   (c) a drying system for the biomass waste stream for removing at least 80% moisture from the biomass utilizing waste gas from a pyrolysis chamber and waste gas from a combustion turbine for heat;
   (d) a sealing system to seal atmospheric air from entering the pyrolysis chamber, controlled by an oxygen sensor in the pyrolysis chamber itself;
   (e) the pyrolysis chamber, producing low to medium BTU gas using set values of the process and controlled by an emission monitor;
   (f) a hot gas cracking chamber to remove tars detected in the gases;
   (g) a hydrosonic scrubbing system to remove particulates and controlled by an off gas emissions monitor (CEMS);
   (h) filtration systems to remove hydrogen sulfide;
   (i) a gas compressor and storage system for the gases to be utilized in the combustion turbine and the pyrolysis chamber.

2. A method of collecting organic waste materials that include the recovery of useful energy comprising:
   (a) sorting diverse waste materials into an organic biomass waste stream while removing all non-organic materials;
   (b) subjecting the biomass waste stream to a drying area to remove at least 80% of the moisture from the biomass waste stream;
   (c) subjecting the waste stream to a sealed environment of extremely high temperatures for pyrolysis resulting in the creation of gases from the waste stream and a residue char;
   (d) processing the hot gases from the pyrolysis to remove chars and impurities in the gases;
   (e) utilizing the exhaust gases recovered in the pyrolysis as energy to provide thermal energy to the pyrolysis process; and
   (f) monitoring each of the system components for integratedly providing control of the biomass waste stream and the amount being processed in the pyrolysis chamber and the recovered fuel gases.

3. The process control described in claim 2 for recovering over 95% of the useable energy of the biomass.

4. The control of the process of claim 2 provides reduction of 90% of the volume of the biomass and a reduction of over 75% of the weight of the biomass.

5. A process as in claim 2 wherein the biomass is converted to gaseous energy in an oxygen free environment controlled by a) the moisture of the incoming feed and b) the temperature of the pyrolysis process.

6. A process as in claim 2 providing integrated control of the feed into the pyrolyzer and the moisture of the feed.

* * * * *